(12) United States Patent
Lanahan et al.

(10) Patent No.: US 7,836,186 B2
(45) Date of Patent: *Nov. 16, 2010

(54) AUTOMATED ADJUSTMENT OF IP ADDRESS LEASE TIME BASED ON USAGE

(75) Inventors: William D. Lanahan, Marlboro, NJ (US); Paul A. Sherman, Freehold, NJ (US); Chesla C. Wechsler, Shrewsbury, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 113 days.

This patent is subject to a terminal disclaimer.

(21) Appl. No.: 12/186,478

(22) Filed: Aug. 5, 2008

(65) Prior Publication Data

US 2008/0294780 A1    Nov. 27, 2008

Related U.S. Application Data

(63) Continuation of application No. 10/119,159, filed on Apr. 10, 2002, now Pat. No. 7,421,499.

(51) Int. Cl.
*G06F 9/46* (2006.01)
*G06F 15/173* (2006.01)
*G06F 15/177* (2006.01)

(52) U.S. Cl. .................... 709/226; 709/224; 718/104
(58) Field of Classification Search ............... 709/224, 709/225, 226, 229, 245; 718/104
See application file for complete search history.

(56) References Cited

U.S. PATENT DOCUMENTS

| | | | |
|---|---|---|---|
| 5,884,037 A | 3/1999 | Aras et al. | |
| 5,996,013 A * | 11/1999 | Delp et al. | 709/226 |
| 6,009,103 A | 12/1999 | Woundy | |
| 6,178,455 B1 | 1/2001 | Schutte et al. | |
| 6,295,298 B1 * | 9/2001 | Hrastar et al. | 370/409 |
| 7,421,499 B1 | 9/2008 | Lanahan et al. | |
| 2002/0120744 A1 * | 8/2002 | Chellis et al. | 709/226 |

* cited by examiner

*Primary Examiner*—Peling A Shaw

(57) ABSTRACT

A method is provided for predicting and/or setting a lease time for packet-switched data communication network resources based on historical usage data of a network system provider subscriber. The packet-switched data communication network resources may include, but are not limited to, IP addresses and bandwidth. As a result, network resources may be allocated more prudently and network traffic may be reduced.

20 Claims, 4 Drawing Sheets

AUTOMATED ADJUSTMENT OF IP ADDRESS LEASE TIME BASED ON USAGE

CROSS-REFERENCE TO RELATED APPLICATIONS

This application is a continuation of U.S. patent application Ser. No. 10/119,159, filed Apr. 10, 2002, now U.S. Pat. No. 7,421,499 B1, which is incorporated herein by reference in its entirety.

FIELD OF THE INVENTION

The present invention relates to network communication services. More specifically, the invention relates to the efficient and judicious allocation of communication network resources for packet-switched data communications networks, including, but not limited to, the internet. Further, such communications resources include, but are not limited to, an internet protocol (IP) address and bandwidth that are allocated to a network accessing device based upon corresponding historical usage data.

BACKGROUND OF THE INVENTION

Network accessing devices (NADs), in the context of the present invention, may include typical customer premises equipment (CPE) including, but not limited to, a personal computer, laptop computer, information appliance, personal data assistant (PDA), data-enabled wireless handset, or any other type of device that is able to access information through a packet-switched data communications network. An IP address for such a NAD connected to a TCP/IP (transmission control protocol/internet protocol) network must be unique on the network, and such IP address is either permanent or dynamic, changing with each log-on session.

As for the dynamic assignment of IP addresses, a NAD that connects onto a TCP/IP network may be assigned an IP address by a Dynamic Host Configuration Protocol (DHCP) server that typically runs on a network server or router. A DHCP server may include software that automatically assigns IP addresses to network accessing devices that are connecting to a TCP/IP network.

Processing systems, including DHCP servers, are known for the allocation of IP addresses for specified durations of lease time. These specified durations of time are based on predetermined, fixed-value criteria including whether the user's network accessing device is a desktop personal computer (PC) or a laptop computer, the user's profile, e.g., whether the user is clerical staff or professional staff, etc.

However, as use of the internet increases exponentially both in terms of the numbers of users and the amount of time logged-on, the need has arisen to allocate IP addresses, as well as other network resources including bandwidth, more efficiently and effectively in view of the limited pool of such resources.

BRIEF SUMMARY OF THE INVENTION

The present invention is directed towards a novel method and system that provides determination of a lease time of packet-switched data communication network resources that include, but are not limited to, IP addresses and bandwidth, based on actual usage history of an individual user, usage of others in a same user-category and usage history for other users accessing a same network resource management entity, which may also be a network resource owning entity. Such allocation of packet-switched data communication network resources may provide more effective use thereof in view of increased demand.

BRIEF DESCRIPTION OF THE DRAWINGS

The scope of the present invention will be apparent from the following detailed description, when taken in conjunction with the accompanying drawings, and such detailed description, while indicating preferred embodiments of the invention, are given as illustrations only, since various changes and modifications within the spirit and scope of the invention will become apparent to those skilled in the art from this detailed description, in which.

DETAILED DESCRIPTION OF THE INVENTION

Figure 1:
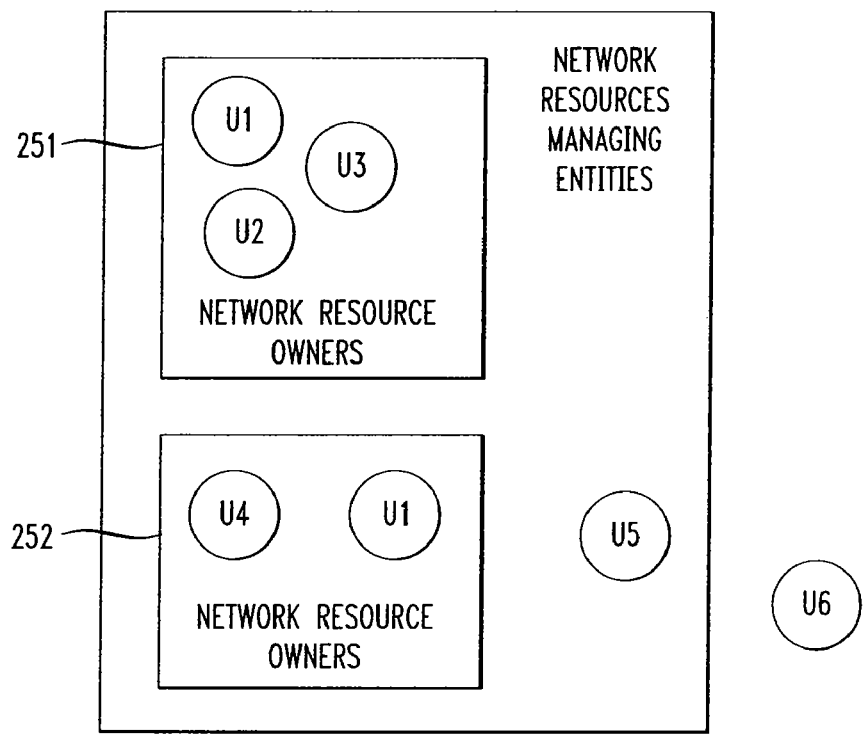
FIG. 1 is a block diagram representing the architecture for a network resource management entity according to an example of the present invention.

The foregoing and a better understanding of the present invention will become apparent from the following detailed description of example embodiments and the claims when read in connection with the accompanying drawings, all forming a part of the disclosure of this invention. While the foregoing and following written disclosure focus on disclosing example embodiments of this invention, it should be clearly understood that the same is by way of illustration and example only and the invention is not limited thereto. The spirit and scope of the present invention are limited only by the terms of the appended claims.

According to the present invention, there exist entities that may "own" resources for networks, including packet-switched data communication networks including, but not limited to, the internet. These network resource owning entities may include Internet Service Providers (ISPs), content providers, corporate intranet network administrators, university network administrators, etc. Further, "owning" resources, in the context of the present invention, may include assuming control by ownership of an interest, a lease or a license to use. For the explanation of the present invention, the network resource owning entities will be referred to as Network Resource Owners (NROs). Further still, allocation of these network resources may be understood to be performed by server protocols on respective servers corresponding to the NROs, and further still the storage of data therein may be understood to be performed by a database corresponding to the respective NROs, though the present invention is not so limited.

NROs may govern the allocation of the network resources that may include, but are not limited to internet protocol (IP) addresses and bandwidth. For example, an NRO may handle the assignment of IP addresses to network accessing devices (NADS) through protocols including dynamic host configuration protocol (DHCP), as is known in the art.

There may further exist entities that manage the allocation of the aforementioned network resources for the individual NROs. For the explanation of the present invention, these network resource management entities will be called network resources managing entities (NRMEs). As an example, NROs having only dial-up capabilities for its subscribers may request that a specified NRME, which may be a high-speed data network provider, manage a block of IP addresses and corresponding bandwidth connection for allocation to the subscribers of the respective NROs. Thus, the NRME may enable the subscribers of the respective NROs to receive a high-speed network connection.

Furthermore, an NRO may also be its own NRME, i.e. an NRO that manages its own network resources. Further still, an NRME may manage its own network resources as well as those of multiple other NROs.

Each of the NROs and NRMEs may also include a usage statistics database, which is used for more efficient allocation of network resources. That is, according to an example of the present invention, users of data communications networks may have characteristics of their usage compiled in a usage statistics database in at least one of an NRO and an NRME, and these databases may be referenced to draw out usage statistics for respective subscribers, all for the sake of efficient allocation of network resources. These subscribers may be aggregated together as users of an NRO, and therefore an NRO may calculate statistics calculated for its entire pool of subscribers, including, for example, NRO averages with regards to time of activity. Similarly, if the resources of a respective NRO are being managed by an NRME, then the NRME may calculate statistics calculated for its entire pool of subscribers, thus calculating an NRME average as well as averages for the respective NROs.

Figure 2:
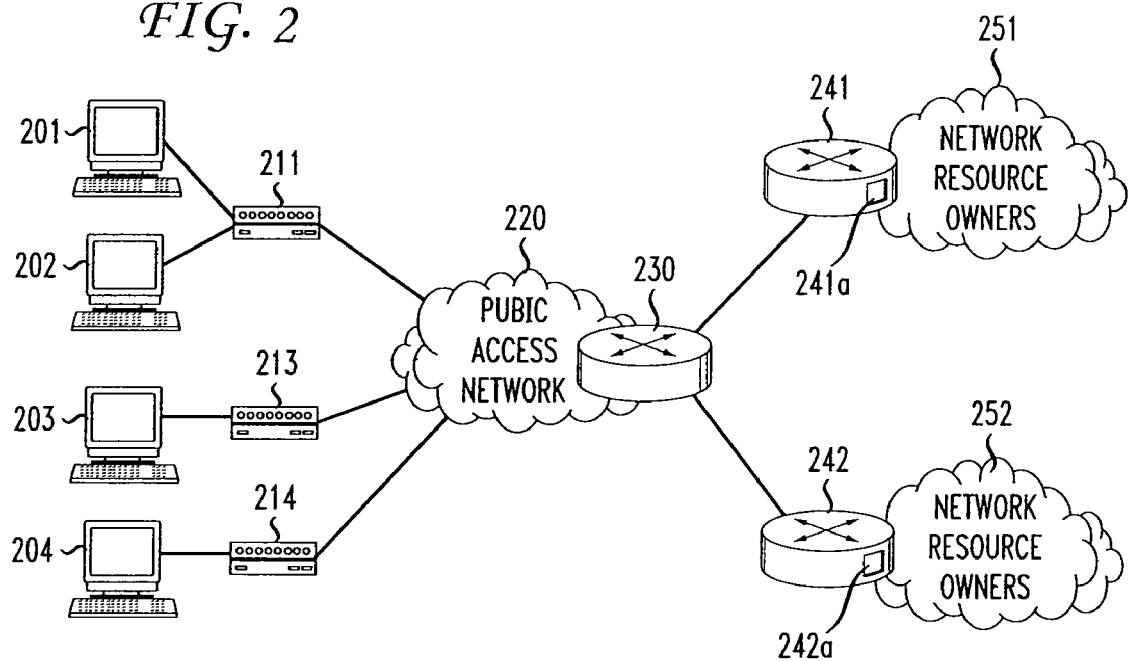
FIG. 2 illustrates an interconnection of packet-switched service networks and an access network as an example physical embodiment implementing the invention.

A method of allocating data communications network resources according to an example of the present invention is described in reference to the example network system of FIG. 2, and then will be further described to include the exemplary NRO/NRME architecture of FIG. 1. It is assumed that all requesting subscribers in the explanation and examples provided below are valid subscribers for the respective networks and NROs.

In FIG. 2, a plurality of subscribers operating network access devices (NADs) 201, 202, 203, . . . , 204 may utilize public access network 220 to access communication network services, which may be facilitated by a plurality of packet-switched data networks 251 and 252. Data communications networks, or "service networks," 251 and 252 may offer access to different services and content, and/or may be operated by different service providers. For explanation of the present invention, the service networks 251 and 252 will be referred to as network resource owners (NROs), which may include internet service providers (ISPs), content providers, corporate intranet network administrators, university network administrators, administrators of other wide area networks (WANs), though the invention is not so limited.

The NROs 251 and 252 may utilize a network addressing scheme to route packets to and from hosts. For example, where the NROs include ISPs which respectively utilize a TCP/IP protocol suite, IP addresses may be assigned to each host and may be utilized for routing data packets from a source to a destination in the networks. See, e.g., "INTERNET PROTOCOL," IETF Network Working Group, RFC 791 (September 1981); S. Deering, R. Hinden, "Internet Protocol, Version 6 (IPv6) Specification," IETF Network Working Group, RFC 1883 (December 1995), which are incorporated by reference herein. The example embodiments of the network communication system is described herein with particular reference to the TCP/IP protocol suite and IP addresses, although those skilled in the art may be readily able to implement the present invention using any of a number of different communication protocols.

The NADs 201, 202, 203, . . . , 204 may include customer premises equipment (CPE) including, but not limited to, a personal computer, laptop computer, information appliance, personal data assistant (PDA), data-enabled wireless handset, or any other type of device that is able to access information through a packet-switched data communications network. Each NAD 201, 202, 203, . . . , 204 may either be connected to or integrated with a network interface unit 211, . . . , 214, including, but not limited to a cable modem, which enables communication through an access network infrastructure 220, as an example.

The access network 220 may include a router 230 that may include a first interface (not shown) with a connection to a server 241 in NRO 251 and a second interface (not shown) with a connection to a server 242 in NRO 252. The router 230 may process packets and may be capable of directing traffic to the proper NRO.

Upon accessing a particular one of NROs 251 and 252, the accessing one of NADs 201, 202, 203, . . . , 204 may be assigned an IP address, which is associated with the particular NRO to which the user of the particular NAD has accessed. The individual IP addresses for the respective NADs 201, 202, 203, . . . , 204 may be assigned by an appropriate protocol server, which may include a dynamic host configuration protocol server (DHCP), that may run on severs 241 and 242, respectively. An example of such server protocol may include DHCP servers 241a and 242a, for example.

According to an example of the present invention, the allocation of network resources, including IP addresses, may be based upon historical usage data to determine an appropriate lease time to be granted for a present request for an IP address. The present invention may further utilize such historical usage data for the allocation of additional data communications network resources including, but not limited to, the allocation of bandwidth for an NRO subscriber. In addition, the allocation of multiple network resources may be related to each other. For instance, IP addresses may be allocated to each other based, in part, on the bandwidth assigned to that particular IP address. Further, the historical usage data may be utilized by network planners to monitor facility usage, including, but not limited to, traffic on a server. Such demographic information may facilitate more efficient use of network hardware and software resources. For example, cumulative historical usage data for an NRO may enable network planners to determine maintenance windows for the associated resources, or even re-distribute resources based on usage patterns. However, the explanation of the present example of the invention will be described in the context of leasing IP addresses, unless otherwise specified.

The historical usage data, according to the present invention may include, but is not limited to, components such as usage for a given subscriber for network resources from a particular NRO, usage for a given user for network resources from any of the respective NROs under the management of a respective NRME. Further, "usage" in the context of the present invention, may refer to, but is not limited to, the amounts of time a particular subscriber is utilizing any of the resources allocated by a respective NRO, the actual dates and times the subscriber is actively utilizing the resources allocated by a respective NRO, the types of data the subscriber accesses while utilizing the resources allocated by a respective NRO, and even a description of the resources allocated by the respective NRO, e.g., the allocated bandwidth.

The historical usage data may be gathered by monitoring or sampling client traffic, i.e., active usage of network resources allocated by an NRO to a subscriber. Such monitoring or sampling of client traffic may include detecting the amount of activity as well as the types of activity by the user while having been allocated network resources from an NRO, e.g. during a given IP address lease time.

Figure 3:
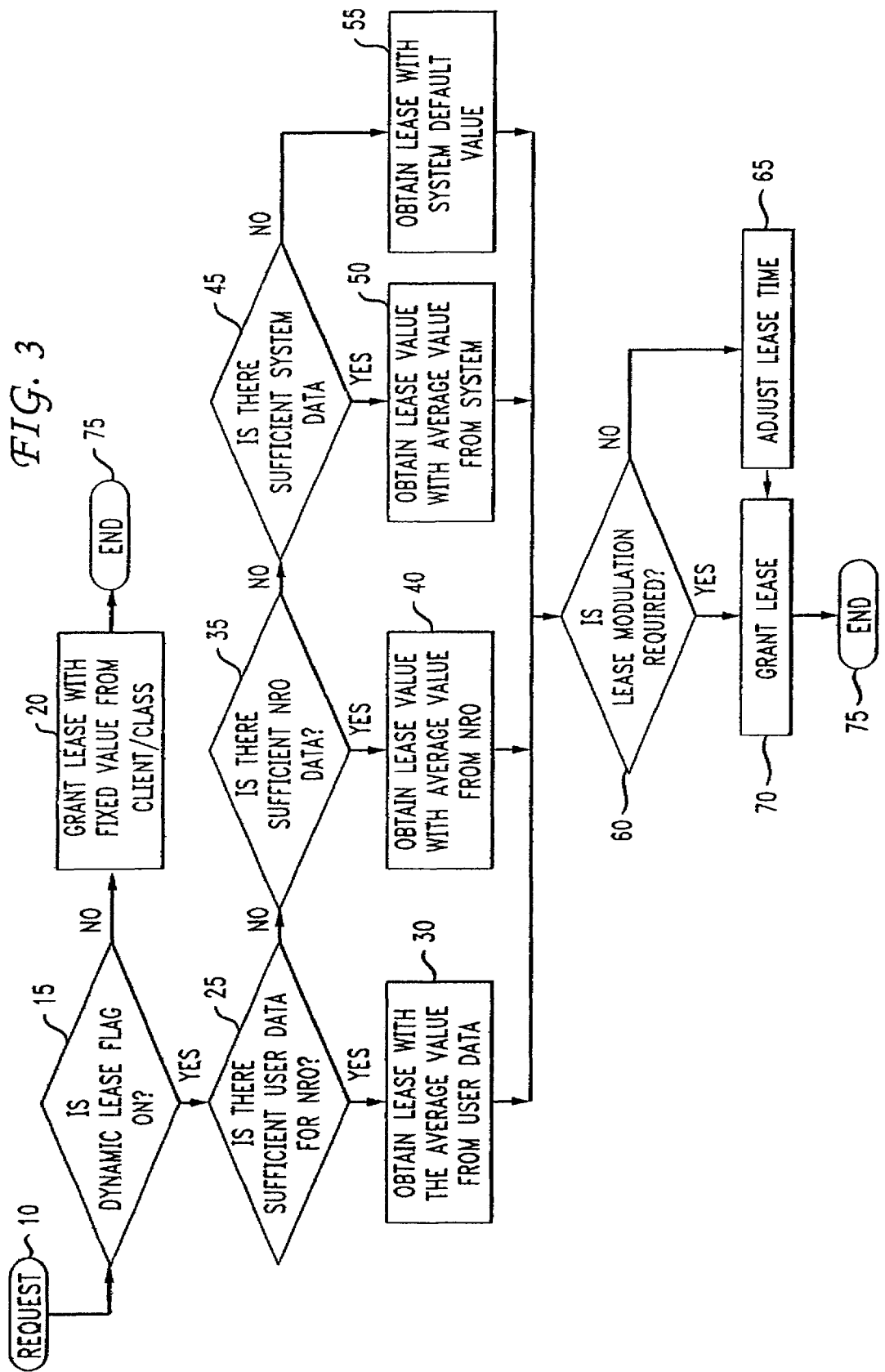
FIG. 3 shows a flowchart of processing performed in accordance with an example of the present invention.

FIG. 3 includes a flow-chart showing the processing according to an example embodiment of the present invention for the allocation of IP addresses by an NRO, though the invention is not so limited. Upon receiving a request for an IP address from any of NADS 201, 202, 203, ..., 204 at server 241 or 242, step 15 includes a determination as to whether a dynamic lease flag is on. The dynamic lease flag indicates whether the user's usage history should be used and stored. That is, it is determined whether dynamic allocation of IP addresses is being implemented by the corresponding NRO or NRME. The processing according to FIG. 3 will be further explained using an example of a subscriber requesting allocation of an IP address, and additional IP resources if specified, from NRO 251, whose resources may be managed by an NRME which is not NRO 251, shown in FIGS. 1 and 2.

If the dynamic lease flag is not on, the requested lease for an IP address from NRO 251 by one of the NADS 201, 202, 203, ..., 204 may be granted based upon predetermined, fixed-value criteria including, but not limited to, whether the respective NAD is a desktop personal computer (PC) or a laptop computer, or the corresponding user's profile, e.g., whether the user is clerical staff or professional staff, etc., at step 20. The processing thus ends at step 75.

However, if the dynamic lease flag is determined to be on at step 15, step 25 may include the NRO 251 further referencing a historical usage database therein to determined whether there is sufficient personal usage history data for an IP address to be leased to the requesting NAD from NRO 251 based on historical usage data for the subscriber.

For example, if a subscriber U1 on any of the NADs is requesting an IP address lease from NRO 251, and it is determined at step 25 that historical usage data for subscriber U1 in NRO 251 meets or exceeds a minimum value, e.g., a minimum number of saved historical usage values, then processing may proceed to step 30. At step 30, an IP address lease value may be obtained based on the average of the historical usage data for subscriber U1 referenced from the historical usage database in NRO 251. Processing may then proceed to step 60.

However, if the request at step 10 includes a subscriber U6 on any of the NADs requesting an IP address from NRO 251 for the first time, or if the number of requests for an IP address lease by subscriber U6 from NRO 251 is less than a configurable threshold value, then it is determined at step 25 that there is not sufficient historical usage data for subscriber U6 in the historical usage database in NRO 251 to obtain an IP address lease value. Processing may then proceed to step 35.

At step 35, it is determined whether the historical usage database in NRO 251 includes sufficient historical usage data for all subscribers thereof to thereby obtain an IP address lease value for subscriber U6 based on the average historical usage data of all subscribers to NRO 251. That is, if the historical usage data of subscribers U1, U2 and U3 stored in NRO 251, shown in FIG. 1, all meet or exceed a configurable threshold value, then step 40 may include obtaining an IP lease value for subscriber U6, based on the average of the historical usage data of subscribers U1, U2, and U3 referenced from the historical usage database in NRO 251. Processing may then proceed to step 60.

However, if the historical usage data of subscribers U1, U2 and U3 stored in NRO 251 does not meet the configurable threshold value, processing may then proceed to step 45. At step 45, it is determined whether the historical usage database in NRME 5, which may manage the network resources of NRO 251 and 252, includes sufficient historical usage data for all subscribers of NRO 251 and 252 to thereby obtain an IP address lease value for subscriber U6 based on the referenced average historical usage data of all the aforementioned subscribers. If the compiled average historical usage data of all NRO subscribers under the management of NRME 5 meets or exceeds a configurable threshold value, then step 50 may include obtaining an IP lease value for requesting subscriber U6 based on the referenced average historical usage data. Processing may then proceed to step 60.

If it is determined at step 45 that average historical usage data referenced from the historical usage database in NRME 5 is not sufficient to thereby obtain an IP address lease value for subscriber U6, then step 55 may include obtaining a default IP lease value for requesting subscriber U6. In that case, there would be no further historical usage data to reference in order to arrive at a different value. Regardless, processing may then proceed to step 60.

At step 60, it is determined whether the IP address lease values obtained at the above-described steps 30, 40, 50 and 55 require modulation. That is, according to the present invention, IP address lease values may be dynamic, subject to an override by a system administrator or logic in the software that may take into account, at least, the current pool of available IP addresses and the current amount of traffic at the respective NRO for requesting and renewing allocation of network resources.

For example, at NRO 251, the server 241 may be dynamically configured to allocate shorter IP address leases to thereby conserve IP addresses if the current pool of IP addresses is at or below a predetermined threshold level. However, the server 241 may further be configured to allocate longer IP address leases in order to minimize the server load, i.e., traffic between the respective NAD 201, 202, 203, ..., 204, caused by repeated requests since, by default, a respective NAD may attempt to renew the IP address lease after one-half of the allocated lease time has elapsed. That is, if current server traffic is at or beyond a configurable threshold level, the server 241 may provide longer IP address leases to thereby significantly reduce the server load by reducing the number of renewal requests.

Therefore, at step 60, if it is determined that the available pool of IP addresses, or other IP resources as specified, is less than a minimum threshold level or the current amount of traffic at NRO 251 meets or exceeds an acceptable maximum threshold level, then step 65 may include an appropriate adjustment to the obtained IP address lease value. Processing may then proceed to step 70.

Processing may also proceed to step 70 if step 60 results in the determination that modulation of the IP address lease time is not required. Regardless, step 70 may include the allocation of an IP address from NRO 251 to the requesting NAD, with the obtained lease value being appropriately adjusted or not.

As mentioned above, the historical usage data may include, but is not limited to, usage data for a subscriber in a particular NRO, average usage data for all users of the particular NRO, and average usage data for all users of respective NROs under the management of an NRME. The historical usage data for a particular subscriber may include the lease time values for IP addresses, as well as the actual dates and times the subscriber has leased the IP resources from a respective NRO as well as a profile of the actual allocated network resources, e.g., bandwidth.

In order to consider a given IP address lease for the compilation and averaging of IP address leases, an NRO and an NRME may require that a given IP address lease have a duration that meets or exceeds a configurable threshold value. That is, since the averages of any values regarding the usage of IP resources may be affected by extreme values, the minimum threshold value may serve to eliminate values that may be due to a subscriber requesting an IP address of an incorrect NRO, and then almost immediately cutting off access thereto or abruptly cutting of access for whatever other reason there may be. Similarly, a maximum threshold value of granted IP addresses may also be used to eliminate IP address leases that were granted due to program "bugs" or the inappropriate renewal of requested leases. Accordingly, only those IP address leases that exceed the minimum threshold time value and are less than the maximum time threshold value are added to a running sum for determining the personal usage history of an individual user, in a given NRO, and for the NRME as a whole.

As set forth above, the allocation of network resources including, but not limited to, IP addresses and bandwidth, is based upon historical usage data for a subscriber having been allocated IP resources from a respective NRO. For gathering and storing such historical usage data, reference is made to FIG. 4, which provides an example of the processing that a server or router undertakes to collect the historical usage data of a subscriber who has been allocated IP resources from a respective NRO.

Figure 4:
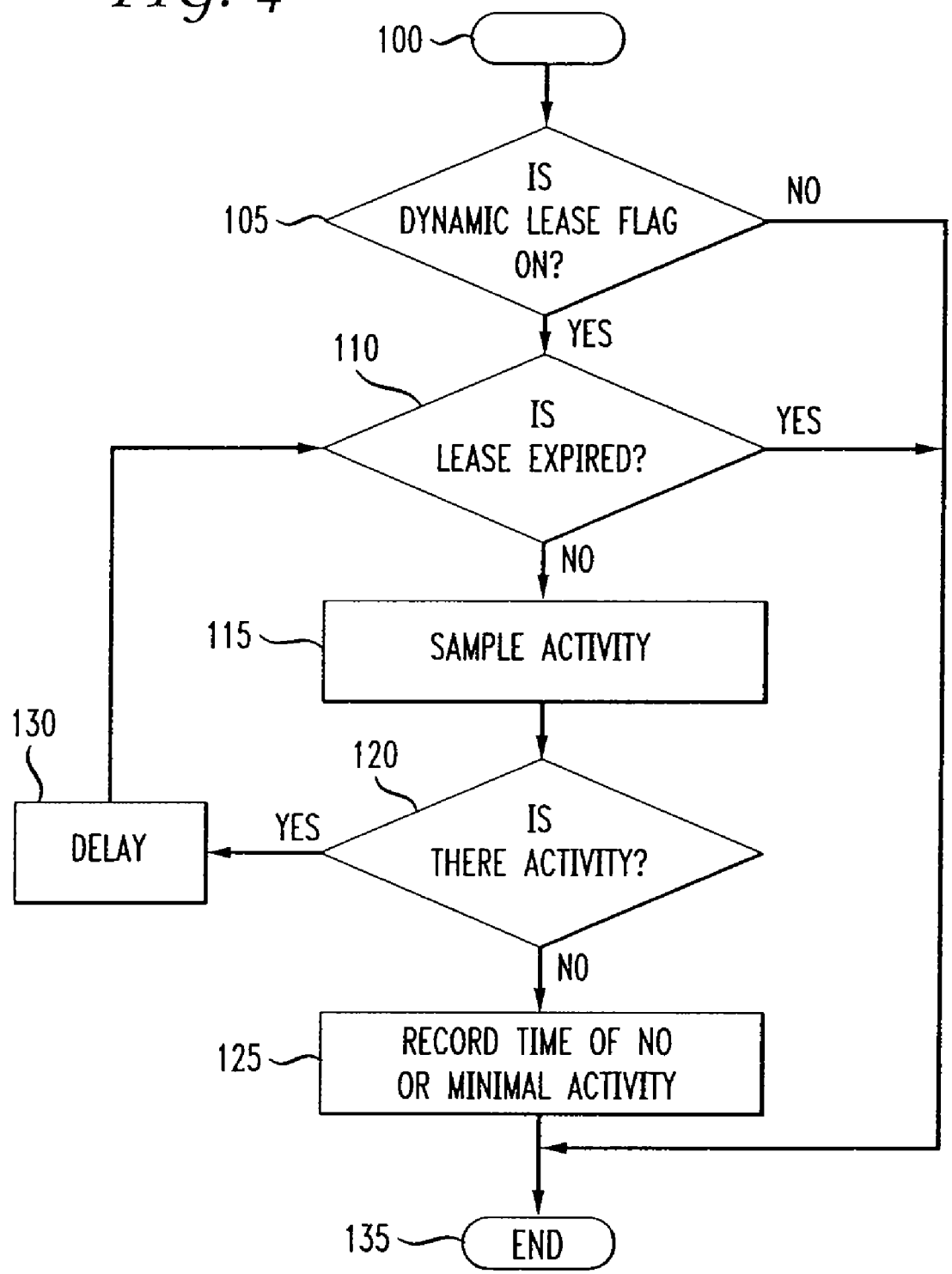
FIG. 4 shows a flowchart of processing for monitoring/sampling activity to store historical usage data in accordance with an example of the present invention.

Step 100 in FIG. 4 may include one of NADs 201, 202, 203, . . . , 204, requesting a network resource from a respective NRO. For the explanation of the processing in FIG. 4, an example will be provided whereby one of the aforementioned NADs is requesting an IP address lease from NRO 251.

At step 105, a determination may be made as to whether the dynamic lease flag is on. If the dynamic lease flag is not on, there is no need to monitor or sample a subscriber's activity, and processing may end at step 135.

However, if it is determined at step 105 that the dynamic lease flag is on, it is then determined whether a current IP address lease for a subscriber has expired at step 110. If the IP address lease has expired, no further monitoring or sampling of the subscriber's activity is required, and the processing ends at step 135.

After an active lease determination at step 110, step 115 may include monitoring or sampling the activity on the NAD that has been allocated a respective IP address from NRO 251, at predetermined time intervals. For example, if NRO 251 has allocated an IP address to NAD 201 for seven days, the NRO 251 may monitor or sample the activity for the IP address on NAD 201 for ten minutes after four days, as in step 115. If continued activity is detected at step 120, a delay in further monitoring or sampling may be implemented at step 130, and processing may then return to step 110.

However, if continued activity on the leased IP address for NAD 201 is not detected at step 120, or if the level of activity is less than a minimum threshold of activity, the time of no or minimal activity may be recorded at step 125, and processing ends at step 135. That is, once a point of no or minimal activity has been detected, that point in time is recorded in the historical usage data for determining future IP address leases for the particular subscriber on the NRO 251. In the absence of a detected point of no or minimal activity, the historical usage data is also recorded upon the expiration of the lease.

Furthermore, the monitoring or sampling of activity is not intended to only detect the presence or absence of activity. Rather, the activity on the leased IP address may be monitored for the type of activity occurring on the IP address to determine the allocation of further IP resources. For example, the monitoring or sampling that occurs for ten minutes on the fourth day of the lease described above may determine that the subscriber is using the IP address to stream-in video data. Thus, the historical usage data has been recorded in the NRO 251 may include a requirement for greater bandwidth for the particular subscriber. Accordingly, at the next request for an IP address, NRO 251 may allocate an IP address that corresponds to a bandwidth that may accommodate streaming video for a length of time in accordance with the personal usage history data of the subscriber using the resources of NRO 251. Alternatively, if it is determined at step 115 that the subscriber merely uses the leased ISP address for e-mail, the next request for an ISP address lease from NRO 251 may result in a lease for an IP address having a minimal bandwidth. Also, certain usage may be removed from consideration if it is determined that the usage is initiated by software on an otherwise unattended device (e.g., software updates that occur as long as the NAD is powered up).

Figure 5:
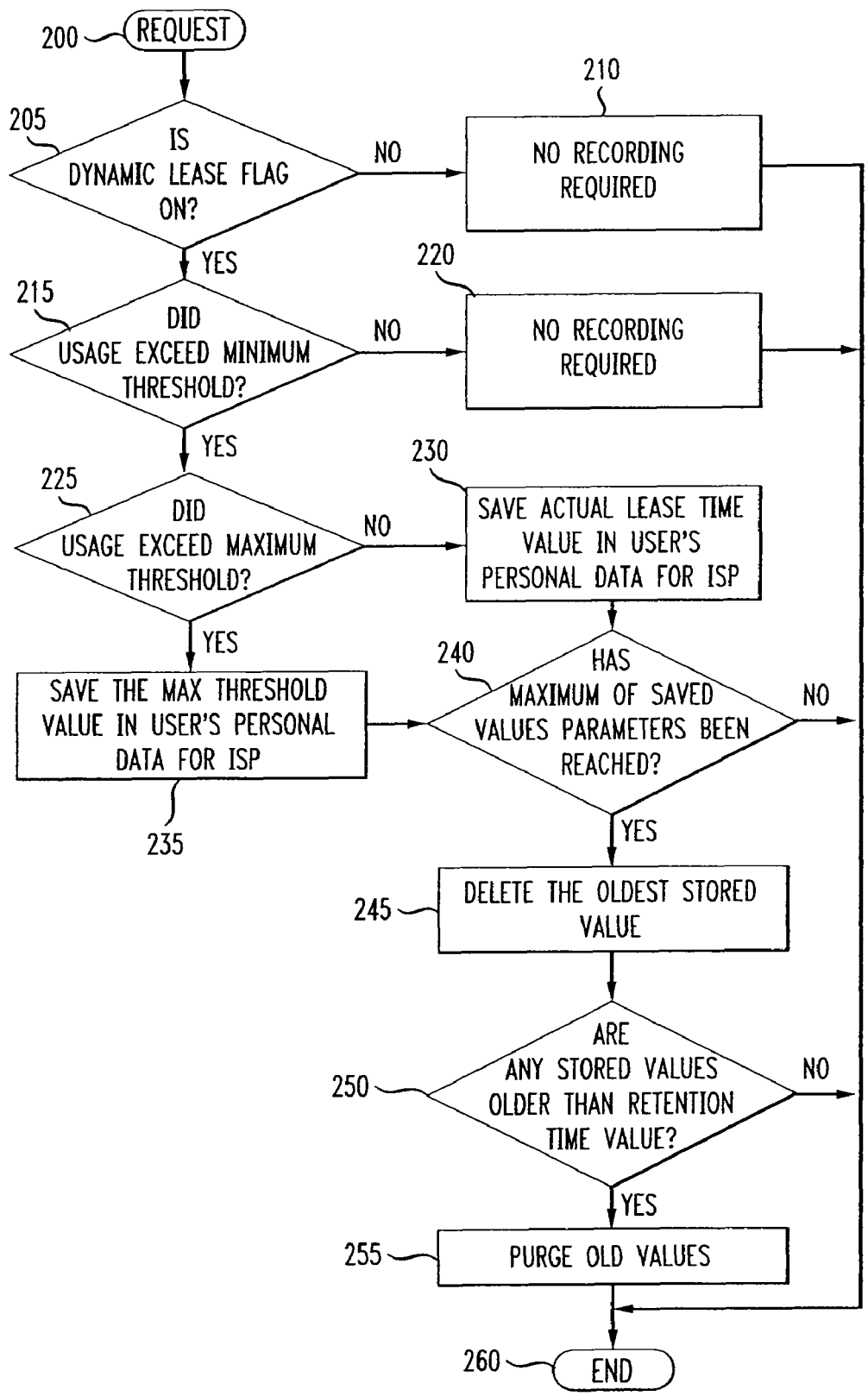
FIG. 5 shows a flowchart of processing for storing historical usage data in accordance with an example of the present invention.

Further still, FIG. 5 shows an example of processing that may be utilized for actually storing the historical usage data that is gathered as described above. First of all, after one of NADs 201, 202, 203, . . . , 204, shown in FIG. 1, requests an IP address from NRO 251, a determination may be made at NRO 251 as to whether the dynamic lease flag is on. That is, at step 205, it may be determined whether NRO 251 will allocate the requested IP address for a dynamic lease time.

If the dynamic lease flag is not on, it is determined at step 210 that there is no need for recording personal usage data for the requesting NAD, and processing ends at step 260. However, if it is determined at step 205 that the dynamic lease flag is on, step 215 to determine if a just completed usage has exceeded the minimal threshold value. If it has not, the usage value may be disregarded, and processing may end at step 260.

If the determination at step 215 finds that the monitored or sampled usage time does exceed the minimum value, step 225 may include the determination as to whether the monitored or sampled usage time exceeds the maximum threshold value. A negative determination may lead to step 230, whereby the usage time may be stored in the personal usage history data of the user, the NRO and the NRME. On the other hand, a determination that the usage time exceeds the maximum threshold value may lead to step 235, whereby the maximum threshold value itself may be stored in the personal usage history data of the user, the NRO and the NRME.

Both of steps 230 and 235 may lead to step 240, whereby a determination may be made as to whether a maximum number of saved usage history data values has been reached. A negative determination may lead to the end of processing at step 260. A positive determination may lead to step 245, whereby the oldest recorded time value for activity using allocated resources from the NRO 251 may be deleted from the NRO.

A determination may then be made at step 250 as to whether there exist any personal usage history data values for the subscriber on the corresponding NRO are older than the retention time value. A negative determination may lead to the end of processing at step 260. A positive determination may lead to step 255 whereby old values may be purged, and processing may end at step 260.

Accordingly, by using such a dynamic approach, which may discard old or excessive data points, the present invention is able to lease network resources, including IP addresses and bandwidth, for packet-switched data communications networks based on past usage by a subscriber. As a result, resources are allocated more efficiently, and network traffic, particularly for network resource owner (NRO) entities and network management resource entities (NRME), may be reduced significantly.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method of allocating network resources, comprising:
   referencing usage history data for a user requesting the network resources;
   comparing the usage history data for the user with a threshold of user history data for the network resources;
   allocating the network resources in accordance with the usage history data for the user if the usage history data satisfies the threshold; and
   allocating the network resources in accordance with average usage history data for a plurality of users of a network resource owning entity if the usage history data does not satisfy the threshold.

2. The method of claim 1, wherein the allocating the network resources comprises modulating a parameter for allocating the network resources based on a current usage of the network resources.

3. The method of claim 1, wherein if the average usage history data for the network resource owning entity does not satisfy the threshold, the allocating the network resources comprises allocating the network resources in accordance with average usage history data for a network resource management entity managing the network resources for the network resource owning entity.

4. The method of claim 3, wherein the network resources comprise an internet protocol address, and wherein the allocating the internet protocol address comprises allocating the internet protocol address for a predetermined amount of time.

5. The method of claim 3, wherein the network resources comprise an internet protocol address having a predetermined corresponding bandwidth.

6. A method of allocating internet protocol addresses from a network resource owning entity, comprising:
   referencing usage history data on the network resource owning entity for a user requesting an internet protocol; and
   allocating the internet protocol address to the user having a lease-time defined in accordance with the usage history data for the user, wherein if the usage history data includes less than a threshold amount of usage history data for the user, the allocating the internet protocol address comprises allocating the internet protocol address in accordance with average usage history data for the network resource owning entity.

7. The method of claim 6, wherein the network resources include an internet protocol address having a predetermined corresponding bandwidth.

8. The method of claim 6, wherein if the average usage history data for the network resource owning entity includes less than a threshold value, the allocating the internet protocol address comprises allocating the internet protocol address in accordance with average usage history data for a network resource management entity managing the network resources for the network resource owning entity.

9. The method of claim 8, wherein if the average usage history data for the network resource management entity is less than a second threshold value, the allocating the internet protocol address comprises allocating the internet protocol address in accordance with a default allocation parameter.

10. The method of claim 6, wherein the threshold amount of usage history data for the user is dynamic.

11. A computer-readable medium having computer-executable instructions for allocating network resources, the computer-executable instructions perform a method comprising:
    referencing usage history data for a user requesting the network resources;
    comparing the usage history data for the user with a threshold of user history data for the network resources;
    allocating the network resources in accordance with the usage history data for the user if the usage history data satisfies the threshold; and
    allocating the network resources in accordance with average usage history data for a plurality of users of a network resource owning entity if the usage history data does not satisfy the threshold.

12. The computer-readable medium of claim 11, wherein the allocating the network resources comprises modulating a parameter for allocating the network resources based on a current usage of the network resources.

13. The computer-readable medium of claim 11, wherein if the average usage history data for the network resource owning entity does not satisfy the threshold, the allocating the network resources comprises allocating the network resources in accordance with average usage history data for a network resource management entity managing the network resources for the network resource owning entity.

14. The computer-readable medium of claim 13, wherein the network resources comprise an internet protocol address, and wherein the allocating the internet protocol address comprises allocating the internet protocol address for a predetermined amount of time.

15. The computer-readable medium of claim 13, wherein the network resources comprise an internet protocol address having a predetermined corresponding bandwidth.

16. A computer-readable medium having computer-executable instructions for allocating internet protocol addresses from a network resource owning entity, the computer-executable instructions perform a method comprising:
    referencing usage history data on the network resource owning entity for a user requesting an internet protocol address; and
    allocating the internet protocol address to the user having a lease-time defined in accordance with the usage history data for the user, wherein if the usage history data includes less than a threshold amount of usage history data for the user, the allocating the internet protocol address comprises allocating the internet protocol address in accordance with average usage history data for the network resource owning entity.

17. The computer-readable medium of claim 16, wherein the network resources include an internet protocol address having a predetermined corresponding bandwidth.

18. The computer-readable medium of claim 16, wherein if the average usage history data for the network resource owning entity includes less than a threshold value, the allocating the internet protocol address comprises allocating the internet protocol address in accordance with average usage history data for a network resource management entity managing the network resources for the network resource owning entity.

19. The computer-readable medium of claim 18, wherein if the average usage history data for the network resource management entity is less than a second threshold value, the allocating the internet protocol address comprises allocating the internet protocol address in accordance with a default allocation parameter.

20. The computer-readable medium of claim 16, wherein the threshold amount of usage history data for the user is dynamic.

* * * * *